(12) United States Patent
Itou et al.

(10) Patent No.: US 10,520,231 B2
(45) Date of Patent: Dec. 31, 2019

(54) INTEGRATED VALVE

(71) Applicant: DENSO CORPORATION, Kariya, Aichi-pref. (JP)

(72) Inventors: Tetsuya Itou, Kariya (JP); Masaaki Kawakubo, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 173 days.

(21) Appl. No.: 15/743,520

(22) PCT Filed: Jun. 29, 2016

(86) PCT No.: PCT/JP2016/069263
§ 371 (c)(1),
(2) Date: Jan. 10, 2018

(87) PCT Pub. No.: WO2017/022378
PCT Pub. Date: Feb. 9, 2017

(65) Prior Publication Data
US 2018/0195780 A1 Jul. 12, 2018

(30) Foreign Application Priority Data
Aug. 3, 2015 (JP) ................................ 2015-153376

(51) Int. Cl.
*F25B 41/04* (2006.01)
*F16K 11/04* (2006.01)
(Continued)

(52) U.S. Cl.
CPC ............ *F25B 41/046* (2013.01); *F16K 11/04* (2013.01); *F16K 11/044* (2013.01); *F16K 11/048* (2013.01); *F16K 31/047* (2013.01)

(58) Field of Classification Search
CPC .. F25B 41/046; F25B 41/04; F25B 2341/066; F25B 2341/06; F25B 2341/062;
(Continued)

(56) References Cited

U.S. PATENT DOCUMENTS 3,650,287 A * 3/1972 Greenawalt ........... F25B 41/046
137/106
2009/0241573 A1 10/2009 Ikegami et al.
(Continued)

FOREIGN PATENT DOCUMENTS

DE 3328312 A1 2/1985
JP S58078469 U 5/1983
(Continued)

*Primary Examiner* — Joseph F Trpisovsky
(74) *Attorney, Agent, or Firm* — Harness, Dickey & Pierce, P.L.C.

(57) ABSTRACT

A first valve member switches between a first communication state, in which a first inlet passage communicates with a first outlet passage and a second inlet passage is closed, and a second communication state, in which the second inlet passage communicates with the first outlet passage and the first inlet passage is closed. A second valve member switches between an opening state and a throttle state in which a smaller volume of a fluid flows from the third inlet passage to the second outlet passage as compared to the opening state. A valve driving member switches between a first operation state, in which the first valve member sets the first communication state and the second valve member sets the opening state, and a second operation state, in which the first valve member sets the second communication state and the second valve member sets the throttle state.

8 Claims, 8 Drawing Sheets

(51) Int. Cl.
*F16K 11/044* (2006.01)
*F16K 11/048* (2006.01)
*F16K 31/04* (2006.01)

(58) Field of Classification Search
CPC ...... F25B 2600/2507; F25B 2600/2513; F16K 11/04; F16K 11/044; F16K 11/048; F16K 31/047; B60H 1/00485; B60H 1/00885; B60H 1/00899
USPC .......................................................... 62/332
See application file for complete search history.

(56) References Cited

U.S. PATENT DOCUMENTS

2015/0217627 A1* 8/2015 Kang ........................ F25B 5/00
62/324.6
2017/0350624 A1 12/2017 Kawakubo

FOREIGN PATENT DOCUMENTS

| | | |
|---|---|---|
| JP | H09089416 A | 4/1997 |
| JP | 2011190920 A | 9/2011 |
| JP | 4803199 B2 | 10/2011 |
| JP | 2014070867 A | 4/2014 |
| JP | 2014149123 A | 8/2014 |
| WO | WO-2016103599 A1 | 6/2016 |

\* cited by examiner

INTEGRATED VALVE

CROSS REFERENCE TO RELATED APPLICATIONS

This application is a U.S. National Phase Application under 35 U.S.C. 371 of International Application No. PCT/JP2016/069263 filed on Jun. 29, 2016 and published in Japanese as WO 2017/022378 A1 on Feb. 9, 2017. This application is based on and claims the benefit of priority from Japanese Patent Application No. 2015-153376 filed on Aug. 3, 2015. The entire disclosures of all of the above applications are incorporated herein by reference.

TECHNICAL FIELD

The present disclosure relates to an integrated valve that is configured by combining more than one valve mechanism.

BACKGROUND ART

A fluid circulation cycle in which a fluid circulates is known to have more than on valve mechanism. For example, Patent Literature 1 discloses that a refrigerant cycle device has such a fluid circulation cycle. Patent Literature 1 discloses that the refrigerant cycle device has, as the fluid circulation cycle, a heat pump cycle in which refrigerant circulates. The heat pump cycle is configured to switch between a cooling path and a heating path.

For example, the refrigeration cycle device disclosed by Patent Literature 1 has a condensing heat exchanger, a subcooling heat exchanger, and a liquid receiver. The condensing heat exchanger, the subcooling heat exchanger, and the liquid receiver are combined with each other and are located outside a room. The refrigeration cycle device has control valves that are configured to switch flow paths configuring the heat pump cycle in which the refrigerant flows. For example, the control valves (i.e., valve mechanisms) include a bypass passage switching valve. The bypass passage switching valve is mounted to a bypass passage and guides the refrigerant to bypass the subcooling heat exchanger.

The bypass passage switching valve opens the bypass passage in a heating mode (i.e., a heating operation mode) such that the refrigerant flows out of the liquid receiver and flows to bypass the subcooling heat exchanger and an evaporator.

The liquid receiver serves as a gas-liquid separator and a liquid reservoir. In the heating mode, an accumulator, which is disposed separately from the liquid receiver, serves as the gas-liquid separator and the liquid reservoir.

PRIOR ART LITERATURES

Patent Literature

Patent Literature 1: JP 4803199 B

SUMMARY OF INVENTION

As described above, the refrigeration cycle device disclosed by Patent Literature 1 is configured to switch between the heating path and the cooling path. However, the refrigeration cycle device disclosed by Patent Literature 1 uses more than one control valve to switch between the heating path and the cooling path. That is, it is necessary to switch the control valves separately. This is the same in any fluid circulation circuits having the control valves (e.g., valve mechanisms), not only in the heat pump cycle.

The present disclosure addresses the above issues, thus it is an objective of the present disclosure to reduce a quantity of control valves mounted to a fluid circulation circuit.

To achieve the above objective, according to an example of the present disclosure, an integrated valve configures a part of a fluid circulation cycle in which a fluid circulates. The integrated valve has a body, a first valve member, a second valve member, and a valve driving member. The body has a first inlet passage, a second inlet passage, a third inlet passage, a first outlet passage, and a second outlet passage. The fluid flows from the first, second, and third inlet passages into the body. The fluid flows out of the body from the first and second outlet passages. The first valve member is housed in the body. The first valve member is configured to switch between a first communication state and a second communication state by moving in an axial direction of an axis. In the first communication state, the first inlet passage communicates with the first outlet passage and the second inlet passage is closed. In the second communication state, the second inlet passage communicates with the first outlet passage and the first inlet passage is closed. The second valve member is housed in the body. The second valve member is configured to switch between an opening state and a throttle state by moving in the axial direction. In the opening state, the fluid flows from the third inlet passage to the second outlet passage. In the throttle state, a smaller volume of the fluid flows from the third inlet passage to the second outlet passage as compared to the opening state. The valve driving member is configured to switch between a first operation state and a second operation state by moving the first valve member and the second valve member in the axial direction. In the first operation state, the first valve member sets the first communication state and the second valve member sets the opening state. In the second operation state, the first valve member sets the second communication state and the second valve member sets the throttle state.

According to the present disclosure, the valve driving member moves the first valve member and the second valve member in the axial direction to switch between the first operation state and the second operation state. When the valve driving member sets the first operation state, the first valve member sets the first communication state and the second valve member sets the opening state. When the valve driving member sets the second operation state, the first valve member sets the second communication state and the second valve member sets the throttle state. Thus, switching between the first communication state and the second communication state by the first valve member and switching between the opening state and the throttle state by the second valve member can be performed at the same time by the valve driving member. As a result, a quantity of control valves can be reduced as compared to a case where one control valve having a first valve member and another control valve having a second valve member are mounted separately from each other. Furthermore, the valve can be operated simply.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
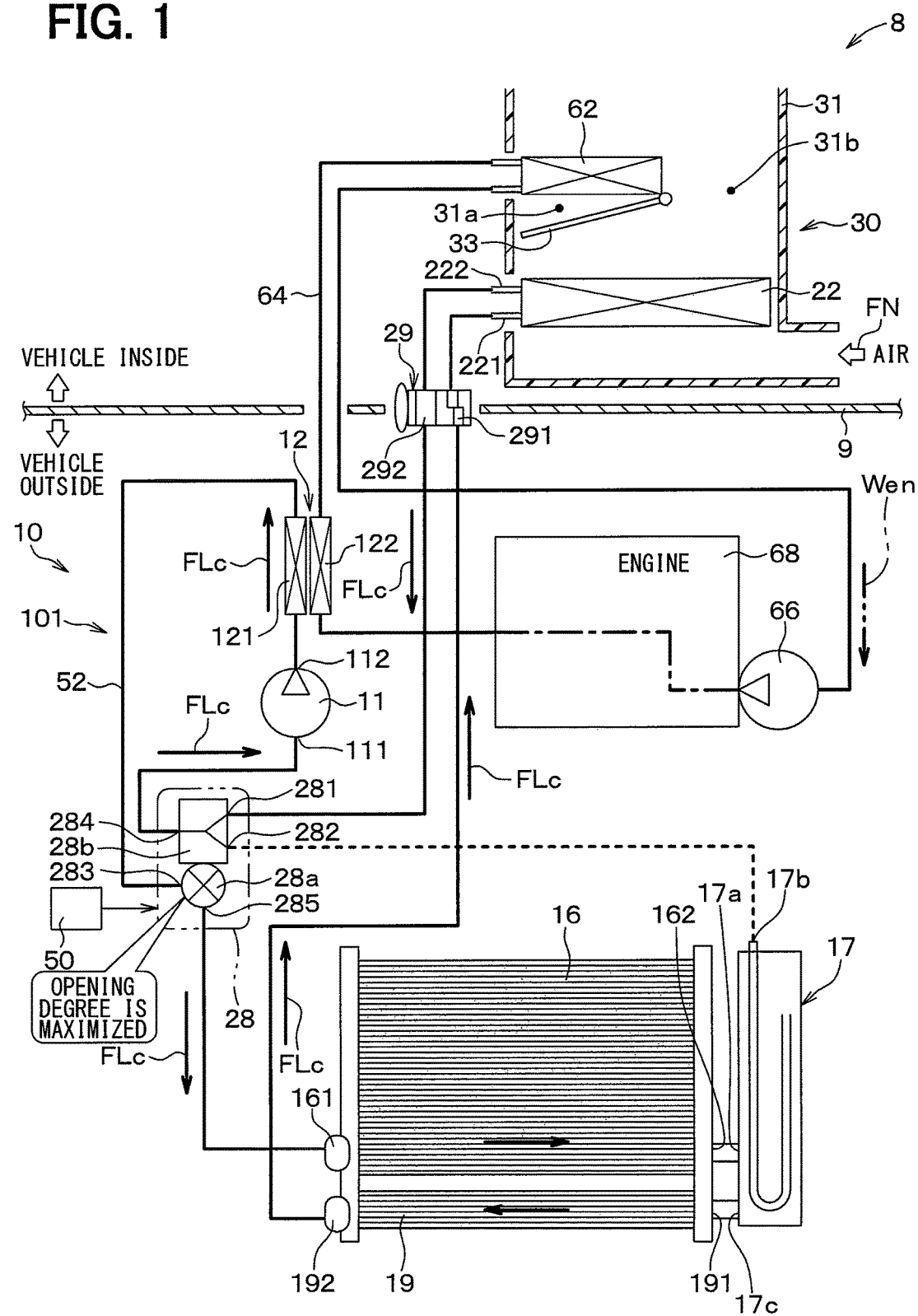
FIG. 1 is a diagram illustrating an entire configuration of a vehicle air conditioner having an integrated valve according to a first embodiment, the diagram showing a refrigeration cycle in a cooling mode by a solid line and showing a path through which the refrigerant does not flow by a dashed line.
Figure 2:
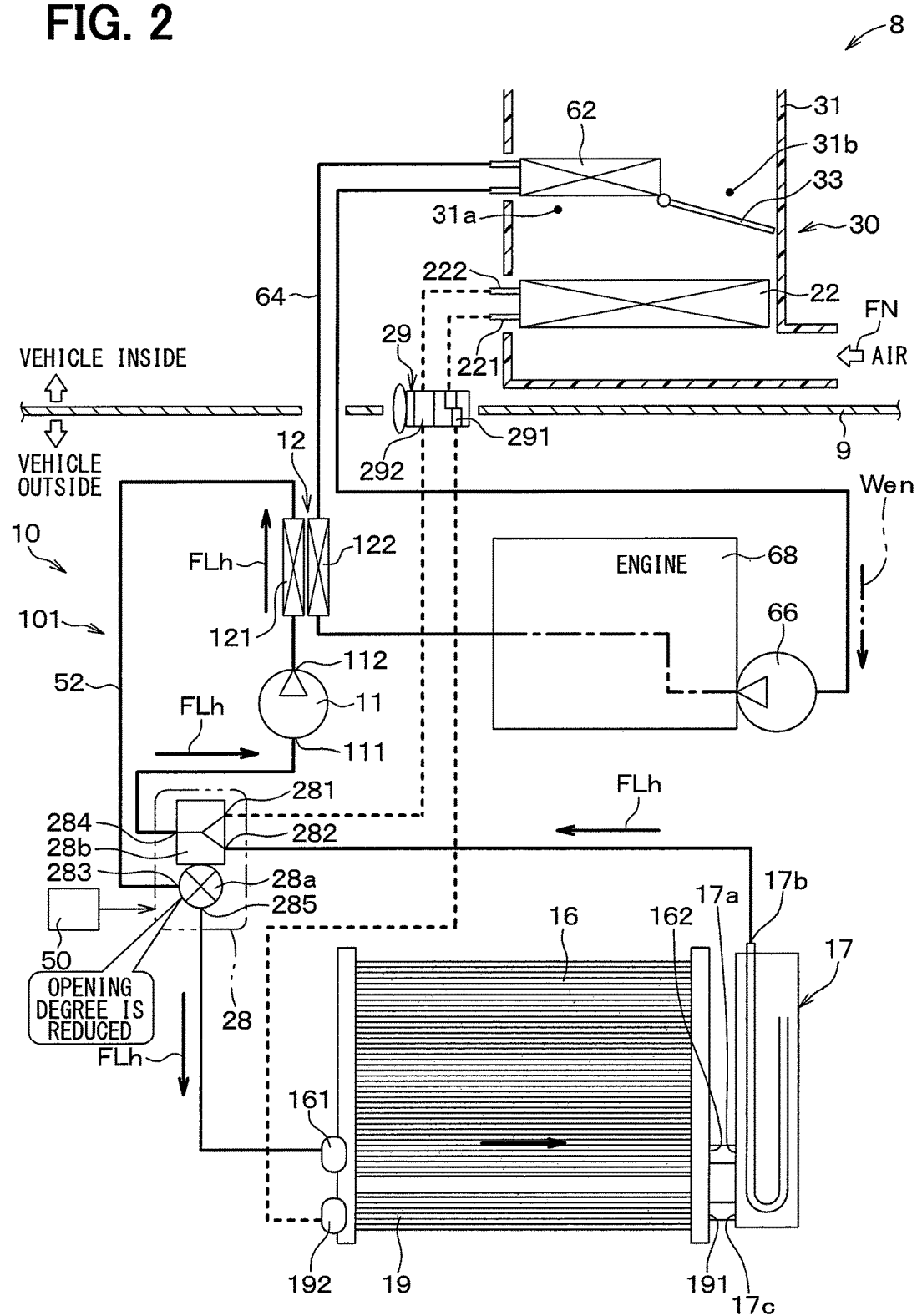
FIG. 2 is a diagram illustrating the entire configuration of the vehicle air conditioner having the integrated valve according to the first embodiment, the diagram showing a refrigeration cycle in a heating mode by a solid line and showing a path through which the refrigerant does not flow by a dashed line.

FIG. 1 and FIG. 2 are diagrams illustrating a whole configuration of a vehicle air conditioner 8 having an integrated valve 28 regarding the present embodiment. The vehicle air conditioner 8 has a vapor-compression refrigeration cycle device 10 having a heat pump cycle 101 in which a refrigerant circulates. The refrigeration cycle device 10 switches between a cooling mode (i.e., a first mode) that cools a vehicle compartment by cooling air to be blown into the vehicle compartment and a heating mode (i.e., a second mode) that heats the vehicle compartment by heating the air. In FIG. 1, a refrigeration cycle in the cooling mode is shown by a solid line, and a path through which the refrigerant does not flow is shown by a dashed line. In FIG. 2, a refrigeration cycle in the heating mode is shown by a solid line, and a path through which the refrigerant does not flow is shown by a dashed line.

The vehicle air conditioner 8 shown in FIG. 1 and FIG. 2 is mounted to a hybrid vehicle that uses power generated by an internal combustion engine (i.e., an engine) and an electric motor. The refrigeration cycle device 10 is mounted to the vehicle air conditioner 8 such that the refrigeration cycle device 10 heats and cools air which is blown into a vehicle compartment. The vehicle compartment is an air conditioning target space.

The heat pump cycle 101 configuring the refrigeration cycle device 10 is a fluid circulation cycle in which a fluid, e.g., a refrigerant, flows. As shown in FIG. 1 and FIG. 2, the heat pump cycle 101 is configured to switch between the refrigeration cycle in the cooling mode and the refrigeration cycle in the heating mode.

The refrigerant circulating in the heat pump cycle 101 is HFC refrigerant (e.g., R134a), and the heat pump cycle 101 configures a subcritical refrigeration cycle in which a temperature of a high-pressure side refrigerant does not exceed a subcritical pressure of the refrigerant. As the refrigerant, HFO refrigerant (e.g., R1234yh) may be used.

The refrigeration cycle device 10 has an electronic control unit (ECU) 50 and the heat pump cycle 101. The heat pump cycle 101 has a compressor 11, a water-cooled condenser 12, an exterior heat exchanger 16, a gas-liquid separator 17, a subcooling device 19, an evaporator 22, the integrated valve 28, a thermal expansion valve 29, various sensors, and a high-pressure pipe 52.

The compressor 11 has a suction port 111 and a discharge port 112 and is housed in an engine room. The engine room is located outside the vehicle compartment and partitioned from the vehicle compartment by an engine room partition wall 9 of the vehicle that mounts the vehicle air conditioner 8.

The compressor 11 draws the refrigerant from the heat pump cycle 101 through the suction port 111, compresses the refrigerant to be a superheated refrigerant, and discharges the superheated refrigerant from the discharge port 112. The compressor 11 is an electric compressor and has a compression mechanism. For example, the compression mechanism is a scroll compression mechanism or a vane compression mechanism.

The compressor 11 is operated by an electric motor. An operation (i.e., a rotational speed) of the electric motor is controlled by a control signal output from the ECU 50. The electric motor is an AC motor or a DC motor. A refrigerant discharge capacity of the compressor 11 is controlled by controlling the rotational speed of the electric motor.

The water-cooled condenser 12 is a well-known water-refrigerant heat exchanger. The water-cooled condenser 12 has a first heat exchanging portion 121 in which the refrigerant flows and a second heat exchanging portion 122 in which an antifreeze fluid as an engine cooling water flows. The first heat exchanging portion 121 is located between the discharge port 112 of the compressor 11 and the high-pressure pipe 52. The high-pressure pipe 52 connects the first heat exchanging portion 121 of the water-cooled condenser 12 and a third inlet passage 283 of the integrated valve 28. The second heat exchanging portion 122 is located in an antifreeze fluid circuit 64 in which the antifreeze fluid flows.

A coolant pump 66 circulates the antifreeze fluid in the antifreeze fluid circuit 64 as shown by an arrow Wen. The second heat exchanging portion 122 is connected to a heater core 62 in series such that the antifreeze fluid flowing out of the second heat exchanging portion 122 returns to an engine 68 after passing through the heater core 62.

The water-cooled condenser 12 is configured to perform a heat exchange between the refrigerant flowing in the first heat exchanging portion 121 and the antifreeze fluid flowing in the second heat exchanging portion 122, thereby heating the antifreeze fluid and cooling the refrigerant by using heat of the refrigerant.

The vehicle air conditioner 8 has an interior air conditioning unit 30. The interior air conditioning unit 30 has a housing 31 that defines a warm air passage 31a therein. The heater core 62 is located in the warm air passage 31a. The heater core 62 is a heat exchanger that performs a heat exchange between the antifreeze fluid flowing in the heater core 62 and the air passing through the heater core 62 in the warm air passage 31*a* thereby heating the air. According to the above-described configuration, the water-cooled condenser 12 serves as a radiator that indirectly dissipates heat of the refrigerant, which is discharged by the compressor 11 and flows into the first heat exchanging portion 121, to the air through the antifreeze fluid and the heater core 62.

The integrated valve 28 is a control valve unit that has more than one valve body. The valve bodies move coordinating with each other based on control signals output from the ECU 50. Specifically, the integrated valve 28 has a decompression portion 28*a* and a three-way portion 28*b*. The decompression portion 28*a* serves as a decompression valve (i.e., an expansion valve) that decompresses and expands the refrigerant. The three-way portion 28*b* serves as a three-way valve that switches between the refrigeration cycles.

The integrated valve 28 configures a part of the heat pump cycle 101.

Figure 3:
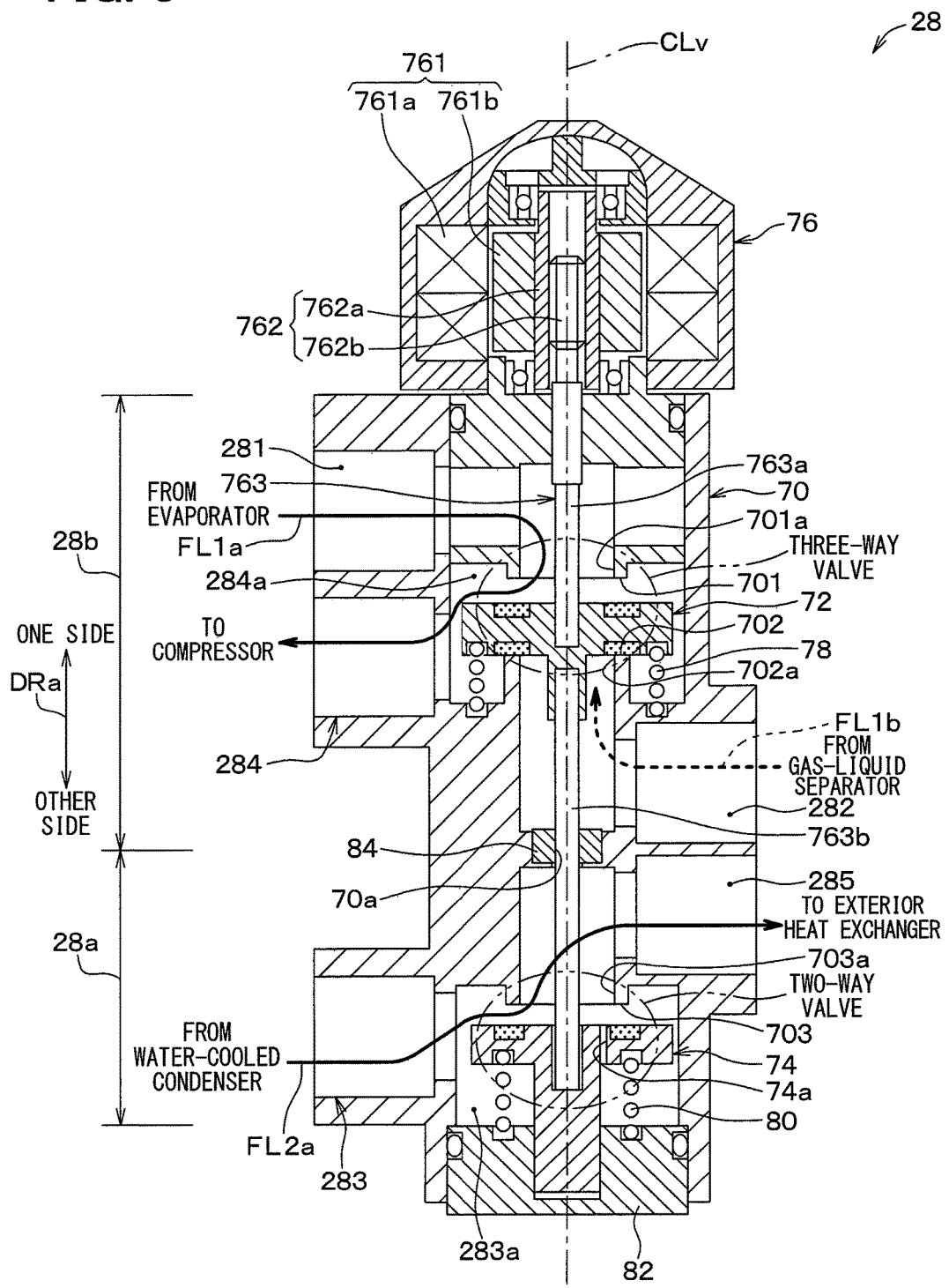
FIG. 3 is a cross-sectional view illustrating the integrated valve according to the first embodiment, the cross-sectional view showing an inside of the integrated valve in the cooling mode.

The integrated valve 28 has a body 70. As shown in FIG. 3, the body 70 has a first inlet passage 281, a second inlet passage 282, and a third inlet passage 283 from which the refrigerant flows into the body 70. The body 70 further has a first outlet passage 284 and a second outlet passage 285 from which the refrigerant flows out of the body 70. FIG. 3 is a cross-sectional view illustrating an inside of the integrated valve 28. FIG. 3 shows the integrated valve 28 in the cooling mode. The decompression portion 28*a* and the three-way portion 28*b* of the integrated valve 28 may be functional portions and are not limited to be separated mechanically.

In the integrated valve 28, the first inlet passage 281 and the second inlet passage 282 serve as inlet passages of the three-way portion 28*b*, and the first outlet passage 284 serves an outlet passage of the three-way portion 28*b*. The third inlet passage 283 serves as an inlet passage of the decompression portion 28*a*, and the second outlet passage 285 serves as an outlet passage of the decompression portion 28*a*.

As shown in FIG. 1 and FIG. 2, the first inlet passage 281 of the integrated valve 28 is connected to the evaporator 22 through a thermosensitive portion 292 of the thermal expansion valve 29. The second inlet passage 282 is connected to a gas-phase refrigerant outlet 17*b* of the gas-liquid separator 17. The third inlet passage 283 is connected to the first heat exchanging portion 121 of the water-cooled condenser 12. The first outlet passage 284 is connected to the suction port 111 of the compressor 11. The second outlet passage 285 is connected to a refrigerant inlet 161 of the exterior heat exchanger 16. A configuration of the integrated valve 28 will be described later.

The exterior heat exchanger 16 performs a heat exchange between the refrigerant and a medium other than the refrigerant. The exterior heat exchanger 16 is located on a front area inside the engine room and has the refrigerant inlet 161 and a refrigerant outlet 162. The refrigerant flowing from the second outlet passage 285 of the integrated valve 28 flows into the refrigerant inlet 161 of the exterior heat exchanger 16. The exterior heat exchanger 16 performs a heat exchange between the refrigerant, which flows out of the second outlet passage 285 and flows in the exterior heat exchanger 16, and an outside air, which is drawn from an outside of the vehicle compartment by a blower fan (not shown). That is, the medium exchanging heat with the refrigerant in the exterior heat exchanger 16 is the outside air according to the present embodiment.

The exterior heat exchanger 16 serves as an evaporator and a condenser depending on a temperature of the refrigerant flowing into the exterior heat exchanger 16. The decompression portion 28*a* of the integrated valve 28 switches the exterior heat exchanger 16 between serving as the evaporator and serving as the condenser. The refrigerant after exchanging heat in the exterior heat exchanger 16 flows to a refrigerant inlet 17*a* of the gas-liquid separator 17. The above-described blower fan is an electric blower, and a rotational speed of the blower fan (i.e., a volume of air blown by the blower) is controlled by a control voltage output from the ECU 50.

The gas-liquid separator 17 has the refrigerant inlet 17*a*, a gas-phase refrigerant outlet 17*b*, and a liquid-phase refrigerant outlet 17*c*. The gas-liquid separator 17 has a well-known gas-liquid separating configuration and separates the refrigerant, which flows into the gas-liquid separator 17, into a gas-phase refrigerant and a liquid-phase refrigerant. The gas-liquid separator 17 is configured to discharge the gas-phase refrigerant from the gas-phase refrigerant outlet 17*b* and discharge the liquid-phase refrigerant from the liquid-phase refrigerant outlet 17*c*.

For example, the second inlet passage 282 of the integrated valve 28 is connected to the gas-phase refrigerant outlet 17*b* of the gas-liquid separator 17, and the second outlet passage 285 of the integrated valve 28 is connected to the refrigerant inlet 161 of the exterior heat exchanger 16. That is, the second inlet passage 282 communicates with the second outlet passage 285 through the exterior heat exchanger 16 and the gas-liquid separator 17. Accordingly, a pressure of the refrigerant in the second inlet passage 282 is substantially equal to a pressure of the refrigerant in the second outlet passage 285. In other words, a pressure of the refrigerant, which flows into the second inlet passage 282 of the integrated valve 28, is closer to a pressure of the refrigerant in the second outlet passage 285 as compared to a pressure of the refrigerant flowing into the first inlet passage 281.

The subcooling device 19 has a refrigerant inlet 191 and a refrigerant outlet 192. The refrigerant inlet 191 is connected to the liquid-phase refrigerant outlet 17*c* of the gas-liquid separator 17. The subcooling device 19 is located between the liquid-phase refrigerant outlet 17*c* of the gas-liquid separator 17 and the thermal expansion valve 29.

The subcooling device 19 performs a heat exchange between the refrigerant flowing from the liquid-phase refrigerant outlet 17*c* and the outside air so as to increase a subcooling degree of the liquid-phase refrigerant by cooling the liquid-phase refrigerant, and then discharges the refrigerant, which has exchanged heat with the outside air, from the refrigerant outlet 192 to the thermal expansion valve 29. That is, the subcooling device 19 is a heat exchanger that subcools the refrigerant flowing from the liquid-phase refrigerant outlet 17*c* of the gas-liquid separator 17. The subcooling device 19, the exterior heat exchanger 16, and the gas-liquid separator 17 are coupled integrally with each other by bolting.

The thermal expansion valve 29 a well-known thermosensitive mechanical expansion valve that has a mechanical mechanism that decompresses and expands the refrigerant flowing into a refrigerant inlet 221 of the evaporator 22 such that a superheat degree of the refrigerant on an outlet side of the evaporator 22, i.e., the refrigerant flowing out of a refrigerant outlet 222 of the evaporator 22, is kept within a specified range. In other words, the thermal expansion valve 29 adjusts the superheat degree of the refrigerant in the refrigerant outlet 222 of the evaporator 22. The thermal expansion valve 29 is used in a vehicle air conditioner commonly and is not necessary to be controlled by the ECU 50 since the thermal expansion valve 29 is a mechanical valve. The thermal expansion valve 29 corresponds to an expansion valve of the present disclosure.

Specifically, the thermal expansion valve 29 has a decompression portion 291 and a thermosensitive portion 292. The decompression portion 291 is located between the refrigerant outlet 192 of the subcooling device 19 and the refrigerant inlet 221 of the evaporator 22. The thermosensitive portion 292 is located between the refrigerant outlet 222 of the evaporator 22 and the first inlet passage 281 of the integrated valve 28. The thermosensitive portion 292 detects the superheat degree of the refrigerant based on a temperature and a pressure of the refrigerant in the refrigerant outlet 222 of the evaporator 22. The decompression portion 291 decompresses the refrigerant by decreasing a volume of the refrigerant flowing through the decompression portion 291 depending on the temperature and the pressure of the refrigerant in the refrigerant outlet 222 of the evaporator 22. In other words, the thermal expansion valve 29 decompresses and expands the refrigerant, which flows from the liquid-phase refrigerant outlet 17c of the gas-liquid separator 17 into the thermal expansion valve 29 through the subcooling device 19, in the decompression portion 291.

The evaporator 22 has the refrigerant inlet 221 and the refrigerant outlet 222. The refrigerant flows into the evaporator 22 from the refrigerant inlet 221 and flows out of the evaporator 22 from the refrigerant outlet 222. The evaporator 22 is located on a upstream side of the heater core 62 in a flow direction of air flowing in the housing 31 of the interior air conditioning unit 30. The evaporator 22 is a cooling heat exchanger that cools the air in the cooling mode. The evaporator 22 evaporates the refrigerant, which flows from the decompression portion 291 of the thermal expansion valve 29, by exchanging heat with the refrigerant and the air flowing in the housing 31. The interior air conditioning unit 30 has a blower located on an upstream side of the evaporator 22. The blower blows the air to the evaporator 22 as shown by an arrow FN.

The interior air conditioning unit 30 further has an air passage switching door 33 in addition to the housing 31. The housing 31 defines the warm air passage 31a and a cool air passage 31b therein. The warm air passage 31a and the cool air passage 31b are arranged in parallel to each other. The heater core 62 is located in the warm air passage 31a. That is, the warm air passage 31a is an air passage that guides the air, which flows into the warm air passage 31a after passing through the evaporator 22, to the heater core 62. The cool air passage 31b is an air passage guides the air to flow bypassing the heater core 62.

The air passage switching door 33 is operated based on a control signal output from the ECU 50. The air passage switching door 33 is positioned at a first door position and a second door position. The air passage switching door 33 closes the warm air passage 31a and opens the cool air passage 31b when being positioned at the first door position. The air passage switching door 33 opens the warm air passage 31a and closes the cool air passage 31b when being positioned at the second door position. Specifically, the air passage switching door 33 is positioned at the first door position in the cooling mode and is positioned at the second door position in the heating mode. For example, the air passage switching door 33 is positioned at the first door position in FIG. 1, and is positioned at the second door position in FIG. 2.

The housing 31 is provided with openings that are located on a downstream side of the warm air passage 31a and the cool air passage 31b. The air (i.e., a conditioned air) after passing through the warm air passage 31a and/or the cool air passage 31b is blown from the openings into the vehicle compartment. The vehicle compartment is the air conditioning target space. The openings include a face opening from which the conditioned air is blown toward an upper body of a passenger, a foot opening from which the conditioned air is blown toward foot of the passenger, and a defroster opening from which the conditioned air is blown toward an inner surface of a windshield. A switching door is arranged in each opening to open and close the opening.

Figure 4:
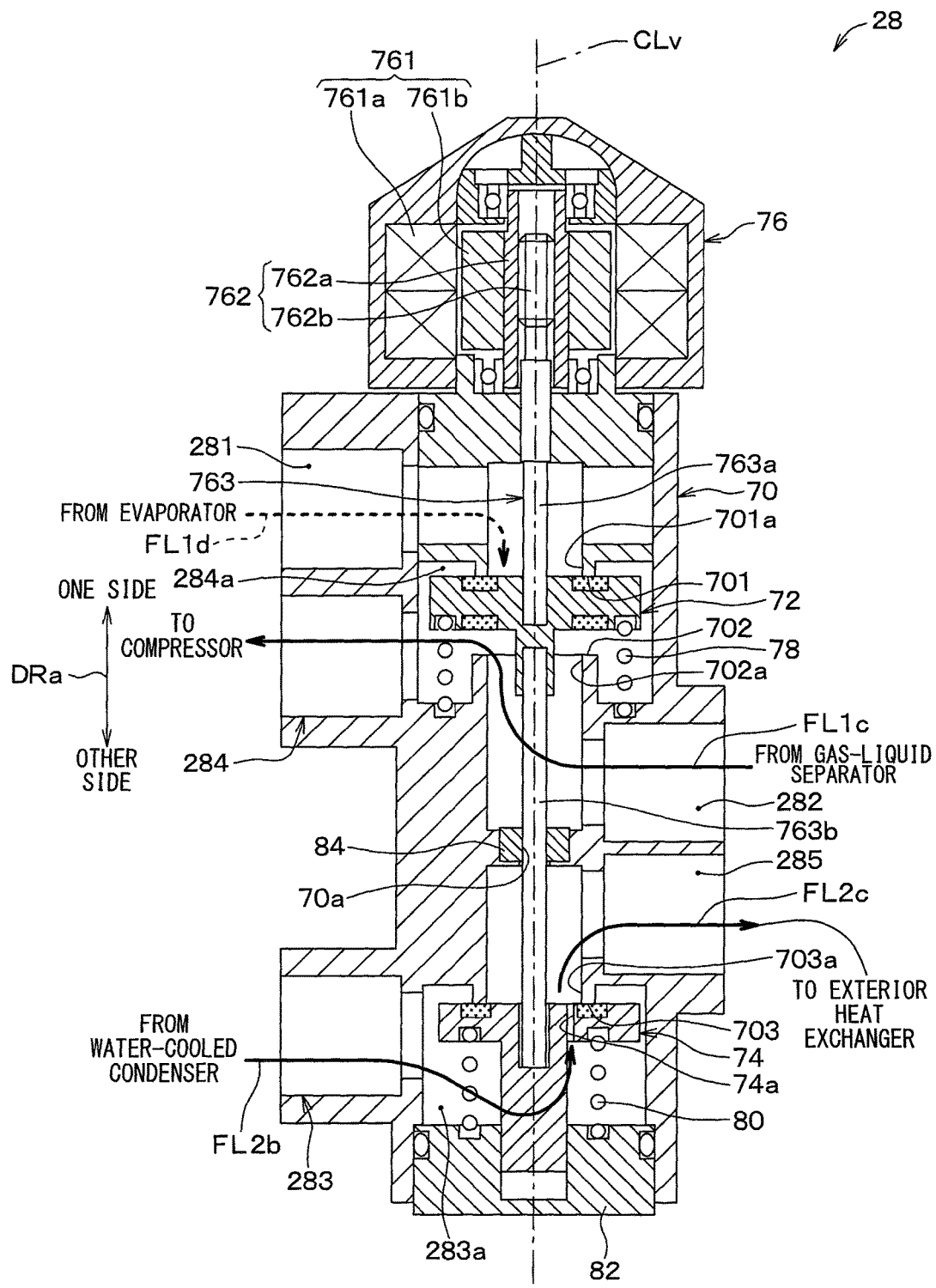
FIG. 4 is a cross-sectional view illustrating the integrated valve according to the first embodiment, the cross-sectional view showing the inside of the integrated valve in the heating mode.

As shown in FIG. 3 and FIG. 4, the integrated valve 28 has the body 70, a first valve member 72, a second valve member 74, a valve driving member 76, a first bias member 78, a second bias member 80, an adjusting screw 82, and a sealing member 84. The body 70 houses the first valve member 72, the second valve member 74, the first bias member 78, and the second bias member 80, and the sealing member 84. FIG. 4 is a cross-sectional view illustrating the inside of the integrated valve 28 similar to FIG. 3 and different from FIG. 3 in a point that the integrated valve 28 is in the heating mode in FIG. 4.

The integrated valve 28 has a valve moving axis CLv as an axis, and the first valve member 72 and the second valve member 74 are arranged in series along the valve moving axis CLv. The valve driving member 76 has an actuator 761. The first valve member 72 and the second valve member 74 are moved by the actuator 761 to move in an axial direction DRa of the valve moving axis CLv integrally with each other. The axial direction DRa will be referred to as a valve moving axial direction DRa hereafter.

Specifically, the body 70 has a first valve seat 701, a second valve seat 702, and a third valve seat 703 therein. The first valve seat 701 therein has a passage communication hole 701a that communicates with the first inlet passage 281. The second valve seat 702 therein has a passage communication hole 702a that communicates with the second inlet passage 282. The third valve seat 703 therein has a passage communication hole 703a that communicates with the second outlet passage 285. The third valve seat 703 serves as a valve seat of the present disclosure.

The first valve member 72 is located between the first valve seat 701 and the second valve seat 702 in the valve moving axial direction DRa. Specifically, the first valve seat 701 is located on a side of the first valve member 72 adjacent to the actuator 761 in the valve moving axial direction DRa. In other words, the first valve seat 701 is located on one side of the first valve member 72 in the valve moving axial direction DRa. The second valve seat 702 is located on an other side of the first valve member 72 in the valve moving axial direction.

The first outlet passage 284 has a first valve chamber 284a. The first valve chamber 284a is a part of the first outlet passage 284 and defined as a connection area where the first valve seat 701 and the second valve seat 702 are located. The first valve chamber 284a houses the first valve member 72 and the first bias member 78.

The third valve seat 703 is located on a side of the second valve member 74 adjacent to the actuator 761 in the valve moving axial direction DRa. In other words, the third valve seat 703 is located on one side of the second valve member 74 in the valve moving axial direction DRa. The third inlet passage 283 has a second valve chamber 283a. The second valve chamber 283a is a part of the third inlet passage 283 and defined as a connection area where the third valve seat 703 is located. The second valve chamber 283a houses the second valve member 74 and the second bias member 80.

The first valve member 72 has a substantially disc shape, and a thickness direction thereof is parallel to the valve moving axial direction DRa. The first valve member 72 serves as a valve body of the three-way portion 28b. The first valve member 72 closes the first inlet passage 281 when being pressed against the first valve seat 701 in the valve moving axial direction DRa. On the other hand, the first valve member 72 closes the second inlet passage 282 when being pressed against the second valve seat 702 in the valve moving axial direction.

That is, the first valve member 72 switches between a first communication state and a second communication state by moving in the valve moving axial direction DRa. In the first communication state, the first inlet passage 281 and the first outlet passage 284 communicate with each other and the second inlet passage 282 is closed. In the second communication state, the second inlet passage 282 and the first outlet passage 284 communicate with each other and the first inlet passage 281 is closed.

The first valve member 72 shown in FIG. 3 sets the first communication state. In the first communication state, the first valve member 72 is distanced from the first valve seat 701 and pressed against the second valve seat 702 to abut on the second valve seat 702. Accordingly, the first valve member 72 guides the refrigerant to flow from the first inlet passage 281 to the first outlet passage 284 as shown by arrow FL1a. At the same time, the first valve member 72 shuts off a flow of the refrigerant flowing into the second inlet passage 282 shown by arrow FL1b.

The first valve member 72 shown in FIG. 4 sets the second communication state. In the second communication state, the first valve member 72 is distanced from the second valve seat 702 and pressed against the first valve seat 701 to abut on the first valve seat 701. Accordingly, the first valve member 72 guides the refrigerant to flow from the second inlet passage 282 to the first outlet passage 284 as shown by arrow FL1c. At the same time, the first valve member 72 shuts off a flow of the refrigerant flowing into the first inlet passage 281 shown by arrow FL1d.

As shown in FIG. 3 and FIG. 4, the second valve member 74 has a substantially disc shape, and a thickness direction thereof is parallel to the valve moving axial direction DRa. The second valve member 74 serves as a valve body of the decompression portion 28a. The second valve member 74 moves as a valve body of a two-way valve.

The second valve member 74 is located on a side opposite to the actuator 761 with respect to the first valve member 72 in the valve moving axial direction DRa. The second valve member 74 has a throttle hole 74a that passes through the second valve member 74 in the valve moving axial direction DRa. The throttle hole 74a is a narrow through-hole and compresses the refrigerant passing through the throttle hole 74a.

The throttle hole 74a of the second valve member 74 communicates with the passage communication hole 703a of the third valve seat 703 when the second valve member 74 abuts on the third valve seat 703. Specifically, the throttle hole 74a has an opening end that is located adjacent to the third valve seat 703. The opening end of the throttle hole 74a is located on an inner side of the third valve seat 703 in a radial direction perpendicular to the valve moving axis CLv.

According to the above-described configuration, the second valve member 74 switches between an opening state and a throttle state by moving in the valve moving axial direction DRa. In the opening state, the second valve member 74 guides the refrigerant to flow from the third inlet passage 283 to the second outlet passage 285 almost without compressing the refrigerant. In the throttle state, the second valve member 74 guides the refrigerant to flow from the third inlet passage 283 to the second outlet passage 285 while compressing the refrigerant in contrast to the opening state.

The second valve member 74 shown in FIG. 3 sets the opening state. In the opening state, the second valve member 74 is separated from the third valve seat 703, whereby the passage communication hole 703a of the third valve seat 703 is open and communicates with the third inlet passage 283. At this time, for example, an opening degree of the passage communication hole 703a is maximized. As a result, the second valve member 74 guides the refrigerant to flow from the third inlet passage 283 to the second outlet passage 285 as shown by arrow FL2a almost without decompressing the refrigerant.

The second valve member 74 shown in FIG. 4 sets the throttle state. In the throttle state, the second valve member 74 is pressed against the third valve seat 703 to abut on the third valve seat 703, whereby the passage communication hole 703a of the third valve seat 703 communicates with the third inlet passage 283 through the throttle hole 74a of the second valve member 74. In other words, in the throttle state, the throttle hole 74a of the second valve member 74 connects the third inlet passage 283 and the passage communication hole 703a of the third valve seat 703 such that the passage communication hole 703a communicates with the third inlet passage 283. In the throttle state, the second valve member 74 compresses the refrigerant flowing from the third inlet passage 283 in contrast to the opening state by guiding the refrigerant to pass through the throttle hole 74a. Accordingly, the refrigerant, which flows as shown by arrow FL2b and arrow FL2c and passes through the throttle hole 74a, is decompressed and expanded by the throttle hole 74a. That is, the second valve member 74 serves as a fixed throttle.

As shown in FIG. 3 and FIG. 4, the first bias member 78 is a compression coil spring that is normally compressed in the valve moving axial direction DRa. The first valve member 72 is located between the first bias member 78 and the first valve seat 701 in the valve moving axial direction DRa. Accordingly, the first bias member 78 biases the first valve member 72 toward the first valve seat 701, i.e., toward the one side of the first valve member 72, in the valve moving axial direction DRa.

The second bias member 80 is a compression coil spring that is normally compressed in the valve moving axial direction DRa. The second valve member 74 is located between the second bias member 80 and the third valve seat 703 in the valve moving axial direction DRa. Accordingly, the second bias member 80 biases the second valve member 74 toward the third valve seat 703, i.e., toward the one side of the second valve member 74, in the valve moving axial direction DRa.

The adjusting screw 82 is a screw member that rotates about the valve moving axis CLv. The adjusting screw 82 is threaded into the body 70. The second bias member 80 is located between the adjusting screw 82 and the second valve member 74 in the valve moving axial direction DRa. The second bias member 80 has an end and an other end facing each other in the valve moving axial direction DRa. The one end abuts on the second valve member 74, and the other end abuts on the adjusting screw 82. Therefore, a bias force that is applied to the second valve member 74 by the second bias member 80, i.e., a spring force generated by the second bias member 80, is increased and decreased depending on an threaded amount of the adjusting screw 82 threaded into the body 70.

The valve driving member 76 has the actuator 761, a feed screw mechanism 762, and a driving shaft 763. The actuator 761 moves the first valve member 72 and the second valve member 74 in the valve moving axial direction DRa.

The actuator 761 is an electric motor such as a stepping motor of which rotational axis coincides with the valve moving axis CLv. The actuator 761 has a stator 761a and a rotor 761b. The stator 761a is configured by an electromagnetic coil and is fixed to the body 70. The rotor 761b is configured by a permanent magnet. The rotor 761b is located on an inner side of the stator 761a in a radial direction of the stator 761a and is rotatable with respect to the stator 761a.

The feed screw mechanism 762 rotates about a rotational axis that coincides with the valve moving axis CLv. The feed screw mechanism 762 is located on an inner side of the rotor 761b in the radial direction. The feed screw mechanism 762 converts a rotation of the actuator 761, which rotates about the valve moving axis CLv, into a movement of the feed screw mechanism 762, which moves in the valve moving direction DRa. The feed screw mechanism 762 has a female screw 762a and a male screw 762b to perform the conversion.

The female screw 762a of the feed screw mechanism 762 is fixed to an inner surface of the rotor 761b, thereby rotating about the valve moving axis CLv integrally with the rotor 761b. That is, the actuator 761 rotates the feed screw mechanism 762 about the valve moving axis CLv.

The male screw 762b is threaded into the female screw 762a and is configured not to be rotatable with respect to the body 70 through the driving shaft 763. Accordingly, the male screw 762b moves in the valve moving axial direction DRa when the actuator 761 rotates the female screw 762a.

The driving shaft 763 is connected to the feed screw mechanism 762 and transmits a displacement of the feed screw mechanism 762 in the valve moving axial direction DRa to the first valve member 72 and the second valve member 74. The driving shaft 763 has a first rod 763a and a second rod 763b having an elongated shape to perform the transmission.

The first rod 763a and the second rod 763b are located coaxially about the valve moving axis CLv and are located in series in the valve moving axis CLv. The first rod 763a is located between the male screw 762b of the feed screw mechanism 762 and the first valve member 72 in the valve moving axial direction DRa. The first rod 763a is configured to move in the valve moving axial direction DRa and is not rotatable with respect to the body 70. The first rod 763a has one end and an other end in the valve moving axial direction DRa. The one end is fixed to the male screw 762b of the feed screw mechanism 762, and the other end abuts on the first valve member 72.

The second rod 763b is located between the first valve member 72 and the second valve member 74 in the valve moving axial direction DRa and is inserted into an insert hole 70a defined in the body 70. In other words, a part of the second rod 763b is located inside the insert hole 70a. The insert hole 70a of the body 70 is a through-hole extending in the valve moving axial direction DRa between the second inlet passage 282 and the second outlet passage 285, which are arranged in the valve moving axial direction. The insert hole 70a mounts the sealing member 84 that blocks a flow of the refrigerant.

The second rod 763b has one end and an other end facing each other in the valve moving axial direction DRa. The one end is fixed to the first valve member 72, and the other end abuts on the second valve member 74.

According to the above-described arrangement of the first rod 763a and the second rod 763b, the driving shaft 763 is moved in the valve moving axial direction DRa when the feed screw mechanism 762 rotates. The driving shaft 763 applies a repelling force to the first valve member 72 and the second valve member 74 against bias force (i.e., spring force) of the first bias member 78 and bias force (i.e., spring force) of the second bias member 80.

The valve driving member 76 switches between a first operation state and a second operation state by moving the first valve member 72 and the second valve member 74 in the valve moving axial direction DRa. In the first operation state, the valve driving member 76 moves the first valve member 72 to set the first communication state and moves the second valve member 74 to set the opening state. In the second operation state, the valve driving member 76 moves the first valve member 72 to set the second communication state and moves the second valve member 74 to set the throttle state.

For example, the valve driving member 76 moves the first valve member 72 and the second valve member 74 toward the other side in the valve moving axial direction DRa against the bias forces of the first bias member 78 and the second bias member 80, thereby switching from the second operation state to the first operation state.

A flow of the refrigerant in the heat pump cycle 101 will be described hereafter referring to FIG. 1 and FIG. 2. The integrated valve 28 serves as a switching device in the heat pump cycle 101 and switches between a first refrigerant cycle as a refrigerant cycle in the cooling mode and a second refrigerant cycle as a refrigerant cycle in the heating mode.

Specifically, the first refrigerant cycle is set when the valve driving member 76 of the integrated valve 28 sets the first operation state as shown in FIG. 3. The refrigerant flows in the first refrigerant cycle as shown by arrow FLc in FIG. 1. That is, in the first refrigerant cycle, the refrigerant passes through the discharge port 112 of the compressor 11, the first heat exchanging portion 121 of the water-cooled condenser 12, the third inlet passage 283 of the integrated valve 28, the second outlet passage 285 of the integrated valve 28, the exterior heat exchanger 16, the gas-liquid separator 17, the subcooling device 19, the decompression portion 291 of the thermal expansion valve 29, the evaporator 22, the thermo-sensitive portion 292 of the thermal expansion valve 29, the first inlet passage of the integrated valve 28, the first outlet passage 284 of the integrated valve 28, and the suction port 111 of the compressor 11, in this order. In the first refrigerant cycle, the refrigerant flowing into the gas-liquid separator 17 cannot flow out of the gas-liquid separator 17 from the gas-phase refrigerant outlet 17b since the second inlet passage 282 of the integrated valve 28 is closed (refer to FIG. 3).

The second refrigeration cycle is set when the valve driving member 76 of the integrated valve 28 sets the second operation state as shown in FIG. 4. The refrigerant flows in the second refrigeration cycle as shown by arrow FLh in FIG. 2. That is, in the second refrigeration cycle, the refrigerant passes through the discharge port 112 of the compressor 11, the first heat exchanging portion 121 of the water-cooled condenser 12, the third inlet passage 283 of the integrated valve 28, the second outlet passage 285 of the integrated valve 28, the exterior heat exchanger 16, the gas-liquid separator 17, the second inlet passage 282 of the integrated valve 28, the first outlet passage of the integrated valve 28, and the suction port 111 of the compressor 11, in this order. In the second refrigeration cycle, the refrigerant flowing into the gas-liquid separator 17 cannot flow out of the gas-liquid separator 17 from the liquid-phase refrigerant outlet 17*c* since the first inlet passage 281 of the integrated valve 28 is closed (refer to FIG. 4).

The ECU 50 shown in FIG. 1 is configured by a microcomputer having CPU, ROM, and RAM (not shown). Signals from the various sensors connected to the ECU 50 are A/C converted by an input circuit (not shown) and then are input to the microcomputer. The ECU 50 serves as an air conditioning controller that performs various air conditioning controls. The ECU 50 performs, as one of the air conditioning controls, a refrigeration cycle switching control that switches between the first refrigeration cycle and the second refrigeration cycle.

Figure 5:
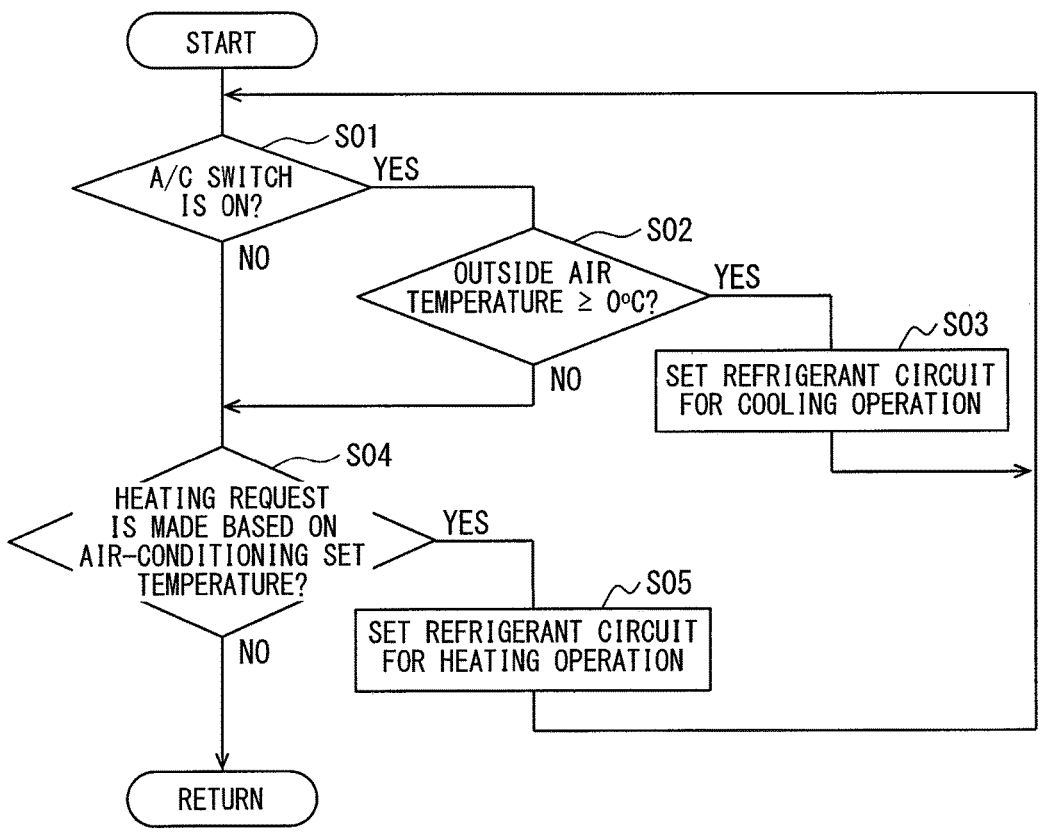
FIG. 5 is a flow chart showing a control flow of a refrigerant circuit switching control performed by an electronic control unit shown in FIG. 1.

FIG. 5 shows a flowchart of a control flow to perform the refrigeration cycle switching control. The ECU 50 starts the control flow shown in FIG. 5 when an ignition switch of the vehicle is turned on, and performs the control flow repeatedly at intervals.

As shown in FIG. 5, the ECU 50 determines whether an A/C button (not shown), which serves as an air conditioning switch, is turned on by a passenger at step S01. The air conditioning switch is an operation switch that is switched between being on and being off, and is located at a location in the vehicle compartment where the passenger operates the air conditioning switch easily. The passenger turns on the air conditioning switch to operate an air conditioning in which the air is cooled or dehumidified by the evaporator 22.

When it is determined that the air conditioning switch is turned on at step S01, the control flow advances to step S02. On the other hand, when it is determined that the air conditioning switch is not turned on at step S01, e.g., when it is determined that the air conditioning switch is turned off, the control flow advances to step S04.

At step S02, the ECU 50 receives a temperature detection signal, which is output from an outside air temperature sensor and relates to an outside temperature, and then determines whether the outside temperature is 0° C. or higher. When the outside temperature is determined to be 0° C. or higher at step S02, the control flow advances to step S03. On the other hand, the control flow advances to step S04 when the outside temperature is determined to be lower than 0° C.

At step S03, the actuator 761 of the integrated valve 28 is operated such that the valve driving member 76 sets the first operation state. In a case where the first operation state has been set already, the first operation state is continued. Accordingly, the first refrigeration cycle for the cooling mode in which the refrigerant flows in the heat pump cycle 101 as shown by arrow FLc (refer to FIG. 1) is set. Thus, the refrigeration cycle device 10 operates in the cooling mode.

The ECU 50 moves the air passage switching door 33 (refer to FIG. 1) to the first door position where the air passage switching door 33 closes the warm air passage 31*a* at the same time as setting the first refrigeration cycle. In addition, the ECU 50 operates a switching valve (not shown) to stop circulating the antifreeze fluid in the antifreeze fluid circuit 64 when the first refrigeration cycle is set. Accordingly, the heater core 62 stops heating the air in the interior air conditioning unit 30, and the refrigerant flows through the first heat exchanging portion 121 of the water-cooled condenser 12 almost without being dissipating heat.

As a result, a gas-phase refrigerant, which is discharged from the discharge port 112 of the compressor 11 and has a high temperature and a high pressure, flows into the exterior heat exchanger 16 through the decompression portion 28*a* of the integrated valve 28 without dissipating heat in the first heat exchanging portion 121 of the water-cooled condenser 12. At this time, the second valve member 74, which serves as the valve body of the decompression portion 28*a*, is open, whereby the gas-phase refrigerant flows, almost without being decompressed in the second valve member 74, from the second outlet passage 285 of the integrated valve 28 to the exterior heat exchanger 16 while being kept superheated.

When the second valve member 74 sets the opening state, the second valve member 74 of the integrated valve 28 adjusts a pressure of the refrigerant, which flows out of the second outlet passage 285 of the integrated valve 28, such that a temperature of the refrigerant becomes higher than the outside temperature in the exterior heat exchanger 16. That is, the exterior heat exchanger 16 serves as a condenser that condenses the refrigerant by performing a heat exchange between the refrigerant and the outside air. The refrigerant after exchanging heat flows from the exterior heat exchanger 16 to the gas-liquid separator 17.

The first valve member 72 of the integrated valve 28 sets the first communication state (refer to FIG. 3) when the first refrigeration cycle is set, whereby the refrigerant does not flow out of the gas-liquid separator 17 from the gas-phase refrigerant outlet 17*b* and flows out of the gas-liquid separator 17 from the liquid-phase refrigerant outlet 17*c*. That is, the gas-liquid separator 17 serves as a receiver that discharges the liquid-phase refrigerant mainly. The interior air conditioning unit 30 is configured to perform a cooling operation in which the evaporator 22 cools the air when the first refrigeration cycle is set. The control flow (shown in FIG. 5) returns to step S01 after step S02.

At step S04, it is determined whether a heating request, which is a request from the passenger to perform a heating operation, is made based on an air-conditioning set temperature. For example, the air-conditioning set temperature is set by the passenger as a target temperature inside the vehicle compartment. For example, the ECU 50 determines that the heating request is made when the air-conditioning target temperature exceeds an inside air temperature inside the vehicle compartment detected by an inside air temperature sensor.

The control flow advances to step S05 when it is determined that the heating request is made at step S04. When it is determined that the heating request is not made, the control flow is end and restarted from step S01.

At step S05, the actuator 761 of the integrated valve 28 is operated such that the valve driving member 76 sets the second operation state. In a case where the second operation state has been set already, the second operation state is continued. Accordingly, the second refrigeration cycle for heating mode in which the refrigerant flows in the heat pump cycle 101 as shown by arrow FLh (refer to FIG. 2) is set. Thus, the refrigeration cycle device 10 is operated in the heating mode.

The ECU 50 moves the air passage switching door 33 (refer to FIG. 1) to the second door position where the air passage switching door 33 opens the warm air passage 31*a* at the same time as setting the second refrigeration cycle. The ECU 50 circulates the antifreeze fluid in the antifreeze fluid circuit 64 when the second refrigeration cycle is set.

Accordingly, the air flows into the warm air passage 31*a* of the interior air conditioning unit 30 shown in FIG. 2, thereby being heated in the heater core 62 by exchanging heat with the antifreeze fluid. In addition, the refrigerant, which flows in the first heat exchanging portion 121 of the water-cooled condenser 12, is condensed and subcooled and then flows out of the first heat exchanging portion 121. That is, the water-cooled condenser 12 does not dissipate heat of the refrigerant, which flows from the first heat exchanging portion 121, when the refrigeration cycle device 10 is operated in the cooling mode, and does dissipate heat of the refrigerant, which flows from the first heat exchanging portion 121, when the refrigeration cycle device 10 is operated in the heating mode.

When the second refrigeration cycle is set, the second valve member 74 of the integrated valve 28 sets the throttle state, whereby the refrigerant flowing into the third inlet passage 283 is decompressed and expanded in the throttle hole 74a (refer to FIG. 4) and becomes a gas-liquid two phase refrigerant. The gas-liquid two phase refrigerant flows from the second outlet passage 285 of the integrated valve 28 to the exterior heat exchanger 16.

When the second valve member 74 sets the throttle state, the second valve member 74 of the integrated valve 28 adjusts a pressure of the refrigerant, which flows out of the second outlet passage 285 of the integrated valve 28, such that a temperature of the refrigerant becomes lower than the outside temperature in the exterior heat exchanger 16. That is, the exterior heat exchanger 16 serves as an evaporator that evaporates the refrigerant by performing a heat exchange between the refrigerant and the outside air. That is, the second valve member 74 of the integrated valve 28 switches between the opening state and the throttle state, such that the exterior heat exchanger 16 is switched between serving as the condenser and serving as the evaporator. The refrigerant after exchanging heat flows from the exterior heat exchanger 16 to the gas-liquid separator 17.

The first valve member 72 of the integrated valve 28 sets the second communication state (refer to FIG. 4) when the second refrigeration cycle is set, whereby the refrigerant does not flow out of the gas-liquid separator 17 from the liquid-phase refrigerant outlet 17c and flows out of the gas-liquid separator 17 from the gas-phase refrigerant outlet 17b. That is, the gas-liquid separator 17 serves as an accumulator that discharges the gas-phase refrigerant mainly. The interior air conditioning unit 30 is configured to perform a heating operation in which the heater core 62 heats the air when the second refrigeration cycle is set. At this time, the refrigerant does not flow through the evaporator 22, whereby the air passes through the evaporator 22 without exchanging heat with the refrigerant. The control flow (shown in FIG. 5) returns to step S01 after step S05.

Although an illustration is omitted, the ECU 50 performs other air conditioning controls in addition to the control flow of FIG. 5 at the same time of operating the control flow of FIG. 5. The air conditioning controls include a blower control, a compressor control, an air passage switching door control, and a blowing mode control. In the blower control, the ECU 50 increases and decreases a volume of air blown by the blower of the interior air conditioning unit 30. In the compressor control, the ECU 50 increases and decreases a rotational speed of the compressor 11. In the air passage switching door control, the ECU 50 rotates the air passage switching door 33. In the blowing mode control, the ECU 50 moves the switching door located in the opening of the housing 31.

Processing of each step shown in FIG. 5 configures a section that exerts a function of the processing.

As described above, according to the present embodiment, the valve driving member 76 of the integrated valve 28 switches between the first operation state and the second operation state by moving the first valve member 72 and the second valve member 74 in the valve moving axial direction DRa. In the first operation state, the first valve member 72 sets the first communication state and the second valve member 74 sets the opening state. In the second operation state, the first valve member 72 sets the second communication state and the second valve member 74 sets the throttle state. Thus, switching between the first communication state and the second communication state by the first valve member 72 and switching between the opening state and the throttle state by the second valve member 74 can be performed at the same time by the valve driving member 76.

As a result, a quantity of control valves can be reduced as compared to a case where the first valve member 72 and the second valve member 74 are mounted to different control valves. Furthermore, the valve can be operated simply. By reducing the quantity of control valves, a mountability of the refrigeration cycle device 10 can be improved, and a manufacturing cost of the refrigeration cycle device 10 can be reduced.

Furthermore, according to the present embodiment, the first inlet passage 281 of the integrated valve 28 is connected to the evaporator 22 in the heat pump cycle 101 shown in FIG. 1 and FIG. 2. The second inlet passage 282 is connected to the gas-phase refrigerant outlet 17b of the gas-liquid separator 17. The third inlet passage 283 is connected to the first heat exchanging portion 121 of the water-cooled condenser 12. The first outlet passage 284 is connected to the suction portion 111 of the compressor 11. The second outlet passage 285 is connected to the exterior heat exchanger 16. Thus, the first refrigeration cycle for the cooling operation and the second refrigeration cycle for the heating operation can be set selectively in a manner that the valve driving member 76 of the integrated valve 28 switches between the first operation state shown in FIG. 3 and the second operation state shown in FIG. 4.

According to the present embodiment, a pressure difference between a pressure of the refrigerant in the second inlet passage 282 and a pressure of the refrigerant in the second outlet passage 285 is very small both in the first refrigeration cycle and the second refrigeration cycle. That is, a pressure of the refrigerant flowing into the second inlet passage 282 of the integrated valve 28 is closer to the pressure of the refrigerant in the second outlet passage 285 than a pressure of the refrigerant flowing into the first inlet passage 281. Therefore, although the insert hole 70a of the body 70 mounts the sealing member 84 according to the present embodiment, the sealing member 84 can be omitted. Even if the sealing member 84 is omitted, the refrigerant does not flow between the second inlet passage 282 and the second outlet passage 285 since the pressure difference between the pressure of the refrigerant in the second inlet passage 282 and the pressure of the refrigerant in the second outlet passage 285 is very small.

According to the present embodiment, the driving shaft 763 moves in the valve moving axial direction DRa by rotating the feed screw mechanism 762. The driving shaft 763 applies the repelling force to the first valve member 72 and the second valve member 74 against the bias force of the first bias member 78 and the bias force of the second bias member 80. As a result, a position of the driving shaft 763 in the valve moving axial direction DRa can be retained by the feed screw mechanism 762 even when the actuator 761 is not energized.

Moreover, the repelling force of the driving shaft 763 is applied in a direction opposite to a direction in which the refrigerant in the second inlet passage 282 pushes the first valve member 72, although the pressure of the refrigerant in the second inlet passage 282 is close to a discharge pressure of the compressor 11 when the first valve member 72 sets the first communication state shown in FIG. 3. That is, when the first valve member 72 sets the first communication state, the feed screw mechanism 762 of the valve driving member 76 presses the first valve member 72 against the second valve seat 702 in the valve moving axial direction DRa, whereby the first valve member 72 closes the second inlet passage 282.

Therefore, when the first valve member 72 sets the first communication state in the cooling mode, the feed screw mechanism 762 of the valve driving member 76 can retain the position of the first valve member 72 closing the second inlet passage 282, although the pressure close to the discharge pressure of the compressor 11 is applied to the first valve member 72 in a direction to open the second inlet passage 282.

According to the present embodiment, the second valve member 74 abuts on the third valve seat 703 in the throttle state and is distanced from the third valve seat 703 in the opening state. The second valve member 74, in the throttle state, guides the refrigerant, which flows from the third inlet passage 283, to pass the throttle hole 74a thereby decompresses the refrigerant in contrast to the opening state. Accordingly, the integrated valve 28 can switch between a state where the refrigerant flowing from the third inlet passage 283 is decompressed and expanded and a state where the refrigerant flows without being decompressed and expanded only by moving the second valve member 74 in the valve moving axial direction DRa.

In addition, the second valve member 74 serves as the fixed throttle in the throttle state. Therefore, a control of the actuator 761 is less affected by a degree of decompression in the throttle hole 74a. As a result, the actuator 761 can be controlled easily.

According to the present embodiment, the gas-liquid separator 17 serves as the receiver that discharges the liquid-phase refrigerant mainly in the first refrigeration cycle for the cooling operation, and serves as the accumulator that discharges the gas-phase refrigerant mainly in the second refrigeration cycle for the heating operation. Therefore, a quantity of the gas-liquid separator can be reduced as compared to the heat pump cycle disclosed by Patent Literature 1 that has two gas-liquid separators serving as an accumulator and a reservoir respectively. Thus, a space occupied by the refrigeration cycle device 10 can be reduced.

Second Embodiment

A second embodiment of the present disclosure will be described. In the present embodiment, features that are different from the first embodiment will be described mainly. A description of a part that corresponds to or equivalents to a matter described in a preceding embodiment may be omitted or simplified. This is the same in a third embodiment that will be described later.

Figure 6:
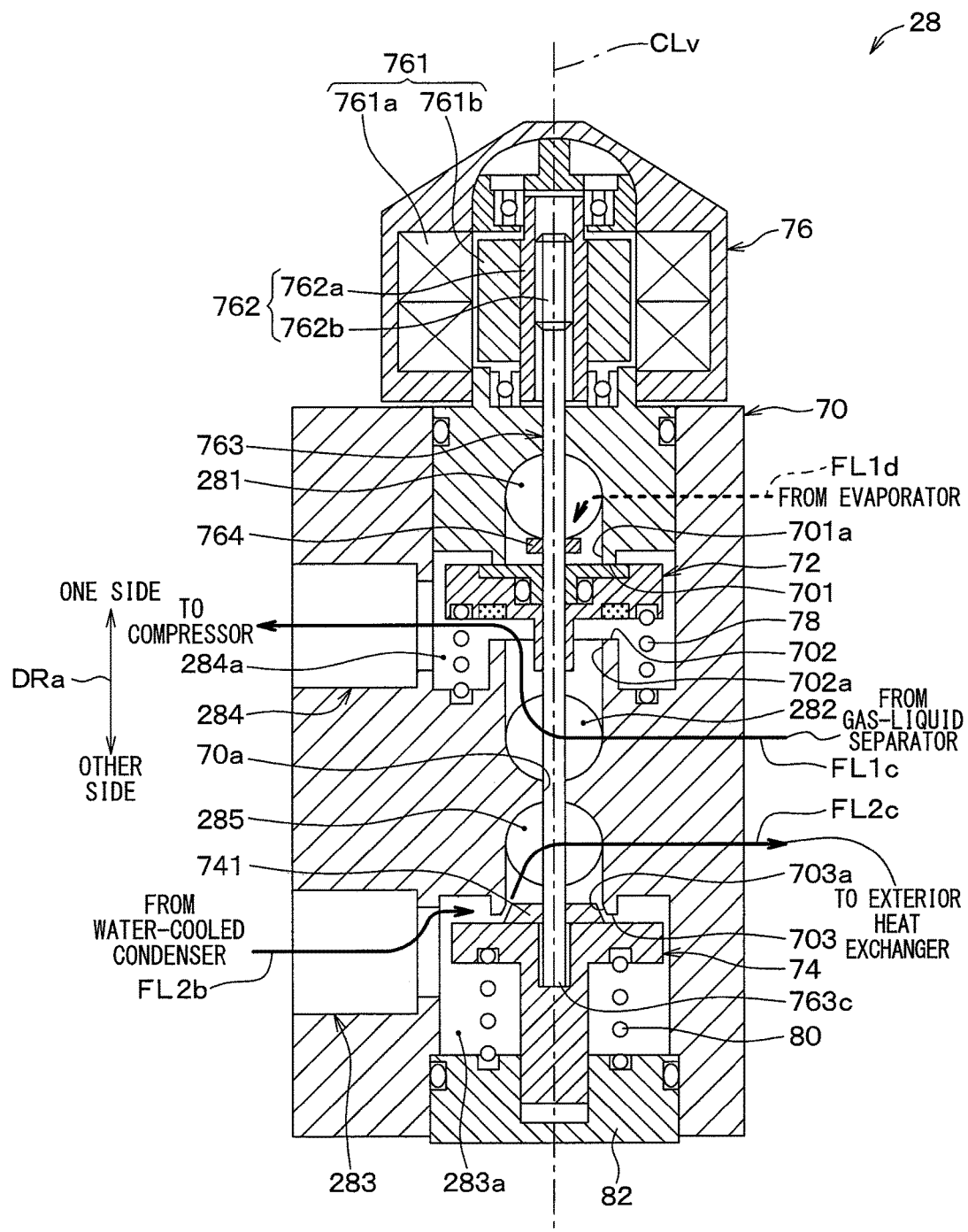
FIG. 6 is a cross-sectional view illustrating an integrated valve according to a second embodiment, the cross-sectional view corresponding to FIG. 4 and showing an inside of the integrated valve in the heating mode.

FIG. 6 is a cross-sectional view illustrating the integrated valve 28 according to the present embodiment. FIG. 6 corresponds to FIG. 4 and shows an inside of the integrated valve 28 in the heating mode. That is, in FIG. 6, the valve driving member 76 of the integrated valve 28 sets the second operation state.

As shown in FIG. 6, the second valve member 74 of the present embodiment does not have the throttle hole 74a (refer to FIG. 4), thereby serving as a variable throttle in the throttle state. This is a difference from the first embodiment. Furthermore, the present embodiment is also different from the first embodiment in a point that the sealing member 84 (refer to FIG. 4) is not disposed.

Specifically, the valve driving member 76 of the present embodiment has the actuator 761, the feed screw mechanism 762, the driving shaft 763, and a pressing portion 764. The driving shaft 763 is configured by a single rod. The driving shaft 763 is located to pass through the first valve member 72 and is configured to move in the valve moving axial direction DRa with respect to the first valve member 72. The driving shaft 763 is located between the male screw 762b of the feed screw mechanism 762 and the second valve member 74. The driving shaft 763 has one end and an other end facing each other in the valve moving axial direction DRa. The one end is fixed to the male screw 762b of the feed screw mechanism 762, and the other end abuts to the second valve member 74.

That is, the other end of the driving shaft 763 serves as an end portion 763c that abuts on the second valve member 74. The end portion 763c is a pressing portion that presses the second valve member 74.

The pressing portion 764 has a disc shape and configures a flange that protrudes radial outward from the driving shaft 763. The pressing portion 764 is configured not to be movable in the valve moving axial direction DRa with respect to the driving shaft 763, for example, in a manner that the pressing portion 764 is inserted into a groove defined in the driving shaft 763. That is, the pressing portion 764 moves in the valve moving axial direction DRa integrally with the driving shaft 763.

The first valve member 72 is located between the pressing portion 764 and the first bias member 78. Accordingly, the driving shaft 763 is configured to press the first valve member 72 through the pressing portion 764 toward the other side of the first valve member 72, i.e., toward the first bias member 78, in the valve moving axial direction DRa.

As shown in FIG. 6, when the valve driving member 76 sets the second operation state, the driving shaft 763 retains the pressing portion 764 at a position distanced from the first valve member 72 in the valve moving axial direction DRa. In addition, the driving shaft 763 presses the first valve member 72 toward the other side in the valve moving axial direction through the pressing portion 764 and presses the second valve member 74 by the end portion 763c of the driving shaft 763 such that the valve driving member 76 switches from the second operation state to the first operation state.

The pressing portion 764 is distanced from the first valve member 72 when the valve driving member 76 sets the second operation state. Accordingly, the driving shaft 763 can move in the valve moving direction DRa in a range where the pressing portion 764 does not come in contact with the first valve member 72. Thus, in the second operation state, the driving shaft 763 changes a throttle degree to decompress the refrigerant flowing from the third inlet passage 283 in a manner that the driving shaft 763 moves in the valve moving axial direction DRa while the pressing portion 764 is distanced from the first valve member 72 toward the one side (e.g., upward in FIG. 6) in the valve moving axial direction DRa.

Specifically, the second valve member 74 has a protrusion 741 that protrudes in the valve moving axial direction DRa into the passage communication hole 703a of the third valve seat 703. The protrusion 741 has a cross section that decreases toward a tip of the protrusion 741. In the second operation state, the driving shaft 763 moves the second valve member 74 to be distanced from the third valve seat 703 in the valve moving axial direction DRa and moves the second valve member 74 in the valve moving axial direction DRa. As a result, a dimension of a void defined between the third valve seat 703 and the protrusion 741 in the radial direction is changed, whereby the throttle degree is changed by the driving shaft 763. The driving shaft 763 reduces the throttle degree to decompress the refrigerant, which flows from the third inlet passage 283 to the second outlet passage 285, as moving toward the other side (i.e., downward in FIG. 6) in the valve moving axial direction DRa.

The present embodiment provides the same effects as the first embodiment relating to common configurations as the first embodiment. In addition, according to the present embodiment, the valve driving member 76 switches from the second operation state to the first operation state in a manner that the driving shaft 763 moves the first valve member 72 toward the other side in the valve moving axial direction DRa through the pressing portion 764 and presses the second valve member 74 using the end portion 763c of the driving shaft 763. In the second operation state, the driving shaft 763 changes the throttle degree to decompress the refrigerant, which flows from the third inlet passage, by moving in the valve moving axial direction DRa while the first valve member 72 is distanced from the pressing portion 764 toward the one side in the valve moving axial direction DRa. Thus, the valve driving member 76 is configured to switch between the first operation state and the second operation state. In addition, the actuator 761 can adjusts a volume of the refrigerant flowing from the second outlet passage 285 to the exterior heat exchanger 16 in the second operation state.

Third Embodiment

A third embodiment of the present disclosure will be described. In the present embodiment, features that are different from the first embodiment will be described mainly.

Figure 7:
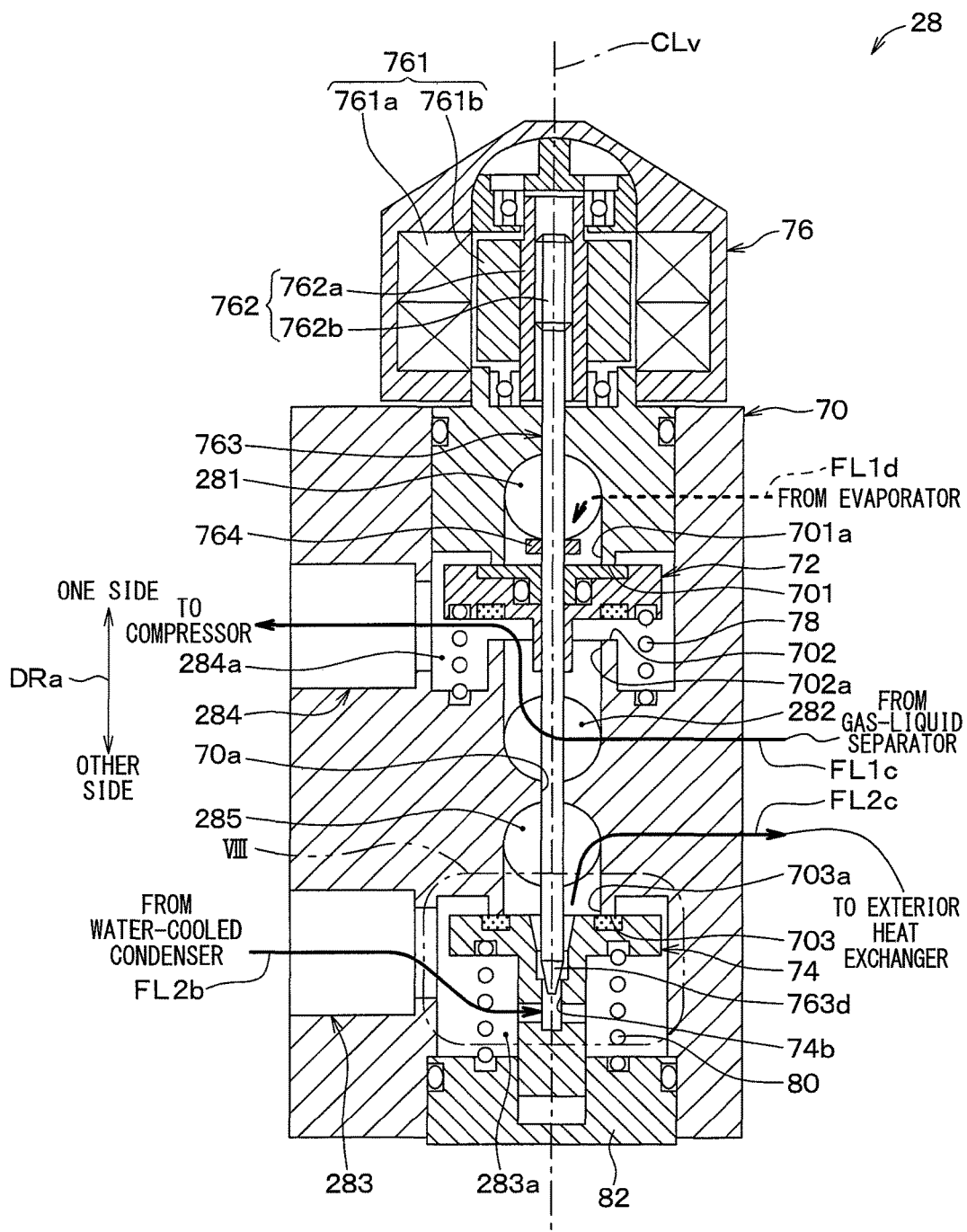
FIG. 7 is a cross-sectional view illustrating an integrated valve according to a third embodiment, the cross-sectional view corresponding to FIG. 4 and showing an inside of the integrated valve in the heating mode.

FIG. 7 is a cross-sectional view illustrating the integrated valve 28 according to the present embodiment. FIG. 7 corresponds to FIG. 4 and shows an inside of the integrated valve 28 in the heating mode. That is, in FIG. 7, the valve driving member 76 of the integrated valve 28 sets the second operation state.

As shown in FIG. 7, the second valve member 74 of the present embodiment has a valve penetration passage 74b instead of the throttle hole 74a shown in FIG. 4. The valve penetration passage 74b passes through the second valve member 74. The valve penetration passage 74b is different from the throttle hole 74a of the first embodiment in a point that a throttle degree to decompress the refrigerant is adjusted by the driving shaft 763. For example, the valve penetration passage 74b is defined in the second valve member 74 to be curved. The present embodiment is different from the first embodiment in a point that the sealing member shown in FIG. 4 is not disposed.

The valve driving member 76 of the present embodiment has the actuator 761, the feed screw mechanism 762, the driving shaft 763, and the pressing portion 764 similar to the second embodiment. The driving shaft 763 is configured by the single rod. The driving shaft 763 is located to pass through the first valve member 72 and is configured to move in the valve moving axial direction DRa with respect to the first valve member 72. The driving shaft 763 is located between the male screw 762b of the feed screw mechanism 762 and the second valve member 74. The driving shaft 763 has the one end and the other end facing each other in the valve moving axial direction DRa. The one end is fixed to the male screw 762b of the feed screw mechanism 762, and the other end abuts to the second valve member 74.

That is, the other end of the driving shaft 763 serves as an end portion 763d that abuts on the second valve member 74. The end portion 763d is a pressing portion that presses the second valve member 74. The end portion 763d has a tapered shape. In addition, the end portion 763d has a disc shape in a cross section perpendicular to the valve moving axial direction.

Figure 8:
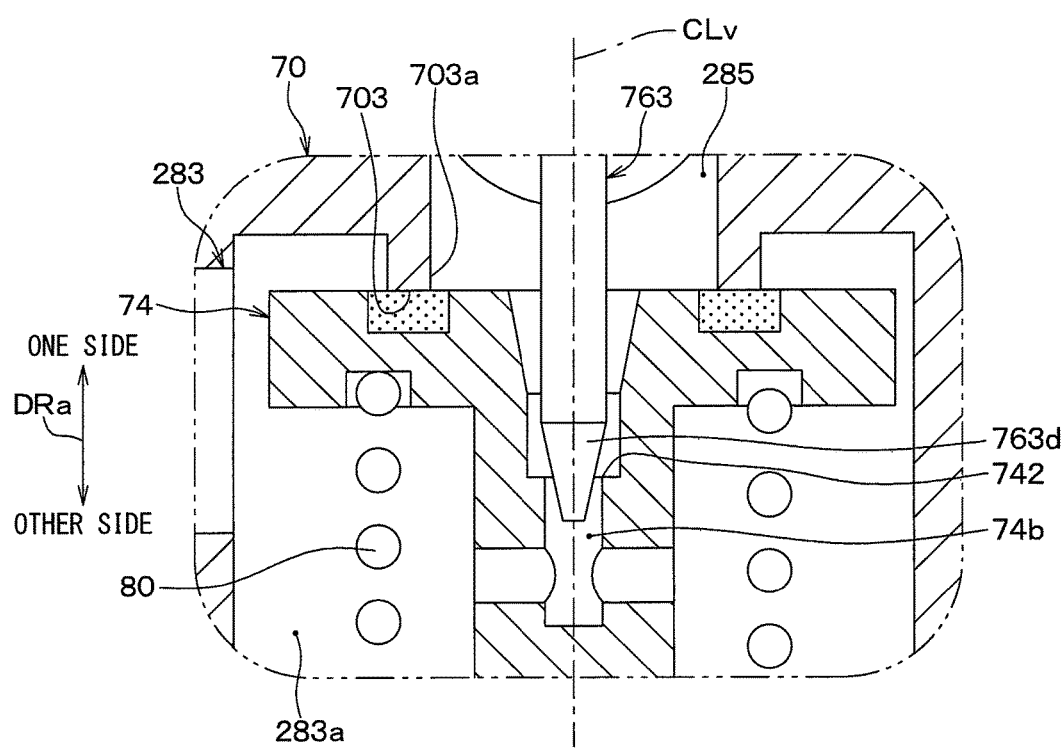
FIG. 8 is an enlarged view of a portion VIII shown in FIG. 7.

As shown in FIG. 8, the second valve member 74 has a rim 742 that defines an opening end of the valve penetration passage 74b. The opening end is open toward the one side (i.e., upward in FIG. 8) in the valve moving axial direction DRa. When the end portion 763d of the driving shaft 763 presses the rim 742 of the second valve member 74, the second valve member 74 switches from the throttle state to the opening state. Similar to the first embodiment, the second valve member 74 abuts on the third valve seat 703 in the throttle state and is distanced from the third valve seat 703 in the opening state. FIG. 8 is an enlarged view of a portion VIII shown in FIG. 7. The pressing portion 764 functions as the same as described in the second embodiment, therefore a description regarding the pressing portion 764 will be omitted.

Since the second valve member 74 is configured as described above, the third inlet passage 283 communicates with the passage communication hole 703a of the third valve seat 703 through the valve penetration passage 74b in the throttle state. The driving shaft 763 increases and decreases a void defined between the end portion 763d of the driving shaft 763 and the rim 742 of the second valve member 74 by moving in the valve moving axial direction DRa, thereby decompressing the refrigerant flowing in the valve penetration passage 74b. Specifically, the driving shaft 763 decreases the throttle degree to decompress the refrigerant flowing in the valve penetration passage 74b as moving toward the one side in the valve moving axial direction DRa, i.e., toward the first valve member 72.

The present embodiment provides the same effects as the first embodiment relating to common configurations as the first embodiment. According to the present embodiment, the second valve member 74 abuts on the third valve seat 703 in the throttle state and is distanced from the third valve seat 703 in the opening state. In the throttle state, the third inlet passage 283 and the passage communication hole 703a of the third valve seat 703 communicate with each other through the valve penetration passage 74b. Furthermore, in the throttle state, the driving shaft 763 reduces the throttle degree to decompress the refrigerant, which flows in the valve penetration passage 74b, as moving toward the one side (i.e., upward in FIG. 8) in the valve moving axial direction DRa. Thus, similar to the second embodiment, the valve driving member 76 is configured to switch between the first operation state and the second operation state. In addition, the second valve member 74 can serve as the variable throttle in the throttle state.

The present embodiment is different from the second embodiment in a point that the rim 742, which decompresses the refrigerant in the throttle state, is provided separately from a portion of the second valve member 74 that abuts on the third valve seat 703. Accordingly, the rim 742 can be designed to have a shape and a size that are appropriate to decompress the refrigerant. As a result, a volume of the refrigerant flowing in the valve penetration passage 74b of the second valve member 74 can be controlled more accurately as compared to the second embodiment.

Modifications (1) The above-described embodiments explains an example that the passage communication hole 703a, which is defined in the third valve seat 703 that is in contact with and distanced from the second valve member 74, communicates with one passage, i.e., the second outlet passage 285, of the third inlet passage 283 and the second outlet passage 285. However, the passage communication hole 703a may communicate with the third inlet passage 283, not with the second outlet passage 285. That is, the passage communication hole 703a communicates with one of the third inlet passage 283 and the second outlet passage 285.

(2) The first embodiment explains an example that the sealing member 84 is mounted to the insert hole 70a of the body 70. However, the sealing member 84 may be omitted.

(3) According to the above-described embodiments, the heat pump cycle 101 has the water-cooled condenser 12 serving as the radiator. However, the heat pump cycle 101 may have a condenser, instead of the water-cooled condenser 12, serving as the radiator. In this case, the condenser is a heat exchanger that is disposed in the warm air passage 31a instead of the heater core 62 in the interior air conditioning unit 30. The condenser condenses the refrigerant discharged from the compressor 11 by performing a heat exchange between the refrigerant and air blown into the vehicle compartment. That is, the condenser serves as a radiator that dissipates heat of the refrigerant to the air directly.

(4) The above-described embodiments explain an example that the integrated valve 28 has the actuator 761 as the valve driving member 76. However, the integrated valve 28 may not have the actuator 761. In this case, for example, the driving shaft 763 is operated by an actuator that is mounted to an outside of the integrated valve 28.

(5) According to the above-described embodiments, the air passage switching door 33 of the interior air conditioning unit 30 is rotated to the first door position or the second door position. However, the air passage switching door 33 may be positioned at an intermediate position of the first position and the second position.

(6) According to the above-described embodiments, the compressor 11 is an electric compressor. However, the compressor 11 may be a belt-driven compressor that is connected to the engine through a belt and is operated by a power generated by the engine.

(7) The heat pump cycle 101 has the subcooling device 19 according to the above-described embodiments, however the subcooling device 19 may be omitted.

(8) According to the above-described embodiments, the exterior heat exchanger 16 performs the heat exchange between the refrigerant and the outside air. However, the exterior heat exchanger 16 may perform a heat exchange between the refrigerant and a fluid other than the outside air.

For example, a coolant circuit that cools at least one of an inverter and a battery is disposed, and the exterior heat exchanger 16 is configured to perform a heat exchange between a cooling water circulating in the coolant circuit and the refrigerant. In this case, the exterior heat exchanger 16 dissipates heat from the refrigerant to the cooling water when the valve driving member 76 sets the first operation state, and/or dissipates heat from the cooling water to the refrigerant when the valve driving member 76 sets the second operation state.

(9) Each processing operated at each step of the flowchart shown in FIG. 5 is exerted by a computer program according to the above-described embodiments, however may be configured by a hard logic.

The present disclosure is not limited to the above-described embodiments. The present disclosure includes various modifications and changes within a scope of the present embodiment. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

What is claimed is:

1. An integrated valve that configures a part of a fluid circulation cycle in which a fluid circulates, the integrated valve comprising:
   a body that has a first inlet passage, a second inlet passage, a third inlet passage, a first outlet passage, and a second outlet passage, the first, second, and third inlet passages from which the fluid flows into the body, the first and second outlet passages from which the fluid flows out of the body;
   a first valve member that is housed in the body, the first valve member that is configured to switch between a first communication state and a second communication state by moving in an axial direction of an axis, the first communication state in which the first inlet passage communicates with the first outlet passage and the second inlet passage is closed, the second communication state in which the second inlet passage communicates with the first outlet passage and the first inlet passage is closed;
   a second valve member that is housed in the body, the second valve member that is configured to switch between an opening state and a throttle state by moving in the axial direction, the opening state in which the fluid flows from the third inlet passage to the second outlet passage, the throttle state in which a smaller volume of the fluid flows from the third inlet passage to the second outlet passage as compared to the opening state; and
   a valve driving member that is configured to switch between a first operation state and a second operation state by moving the first valve member and the second valve member in the axial direction, the first operation state in which the first valve member sets the first communication state and the second valve member sets the opening state, the second operation state in which the first valve member sets the second communication state and the second valve member sets the throttle state.

2. The integrated valve according to claim 1, wherein the fluid circulation circuit is a heat pump cycle in which a refrigerant serving as the fluid circulates, the heat pump cycle has:

a compressor that draws the refrigerant, compresses the refrigerant, and discharges a compressed refrigerant;

a radiator that dissipates heat of the compressed refrigerant, which is discharged by the compressor, to air that is blown into an air conditioning target space;

a heat exchanger that performs a heat exchange between the refrigerant and a medium other than the refrigerant;

a gas-liquid separator that separates the refrigerant, which flows from the heat exchanger, into a gas-phase refrigerant and a liquid-phase refrigerant, the gas-liquid separator that has a gas-phase refrigerant outlet and a liquid-phase refrigerant outlet, the gas-phase refrigerant outlet from which the gas-phase refrigerant flows out of the gas-liquid separator, the liquid-phase refrigerant outlet from which the liquid-phase refrigerant flows out of the gas-liquid separator;

an expansion valve that decompresses and expands the liquid-phase refrigerant flowing from the liquid-phase refrigerant outlet of the gas-liquid separator; and an evaporator that evaporates the refrigerant, which flows from the expansion valve, by performing a heat exchange between the refrigerant and the air, the first inlet passage is connected to the evaporator, the second inlet passage is connected to the gas-phase refrigerant outlet of the gas-liquid separator, the third inlet passage is connected to the radiator, the first outlet passage is connected to the compressor, and the second outlet passage is connected to the heat exchanger.

3. The integrated valve according to claim 1, wherein the body has an insert hole that is a through hole extending in the axial direction between the second inlet passage and the second outlet passage, the insert hole in which a part of the valve driving member is located, and a pressure of the fluid flowing into the second inlet passage is closer to a pressure of the fluid flowing out of the second outlet passage than a pressure of the fluid flowing into the first inlet passage.

4. The integrated valve according to claim 1, the integrated valve further comprising:

a first bias member that is housed in the body and biases the first valve member toward one side in the axial direction; and a second bias member that is housed in the body and biases the second valve member toward the one side in the axial direction, wherein the valve driving member switches from the second operation state to the first operation state by moving the first valve member and the second valve member toward an other side of the axial direction opposite to the one side in the axial direction.

5. The integrated valve according to claim 4, wherein the valve driving member has
a feed screw mechanism that is operated by an actuator to rotate about the axis and
a driving shaft that is connected to the feed screw mechanism, and the driving shaft is moved in the axial direction in conjunction with a rotation of the feed screw mechanism and thereby applying a repelling force to the first valve member and the second valve member against a bias force from the first bias member and a bias force from the second bias member.

6. The integrated valve according to claim 1, the integrated valve further comprising:

a first bias member that is housed in the body and biases the first valve member toward one side in the axial direction; and a second bias member that is housed in the body and biases the second valve member toward the one side in the axial direction, wherein the valve driving member has
a driving shaft that passes through the first valve member and has an end portion, the end portion that pushes the second valve member and
a pressing portion that moves in the axial direction integrally with the driving shaft, and the driving shaft
pushes the first valve member toward an other side in the axial direction opposite to the one side in the axial direction through the pressing portion and presses the second valve member by the end portion, thereby operating the valve driving member to switch from the second operation state to the first operation state and
moves in the axial direction while the pressing portion is distanced from the first valve member toward the one side in the axial direction thereby changing a throttle degree of the third inlet passage through which the fluid flows into the body, when the valve driving device sets the second operation state.

7. The integrated valve according to claim 6, wherein the body has a valve seat provided with a passage communication hole, the passage communication hole that communicates with one passage of the third inlet passage and the second outlet passage, the second valve member has a valve penetration passage that passes through the second valve member, the second valve member is in contact with the valve seat in the throttle state and is distanced from the valve seat in the opening state, and in the throttle state,
the passage communication hole communicates with an other passage of the third inlet passage and the second outlet passage through the valve penetration passage and
the driving shaft increases a volume of the fluid flowing through the valve penetration passage as moving toward the one side in the axial direction.

8. The integrated valve according to claim 1, wherein the body has a valve seat provided with a passage communication hole, the passage communication hole that communicates with one passage of the third inlet passage and the second outlet passage, the second valve member has a throttle hole that passes through the second valve member, the passage communication hole communicates with an other passage of the third inlet passage and the second outlet passage through the throttle hole in the throttle state, and the second valve member
is in contact with the valve seat in the throttle state and is distanced from the valve seat in the opening state and
is configured to guide the fluid to flow from the third inlet passage into the throttle hole thereby decreasing a volume of the fluid flowing from the third inlet passage into the body in the throttle state.

* * * * *